(12) United States Patent
Jakob et al.

(10) Patent No.: US 6,798,677 B2
(45) Date of Patent: Sep. 28, 2004

(54) MODULAR POWER CONVERTER

(75) Inventors: Roland Jakob, Berlin (DE); Michael Fernahl, Berlin (DE); Georg Beinhold, Berlin (DE)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/343,513

(22) PCT Filed: Jun. 2, 2001

(86) PCT No.: PCT/EP01/06326
§ 371 (c)(1),
(2), (4) Date: Jul. 15, 2003

(87) PCT Pub. No.: WO02/11273
PCT Pub. Date: Feb. 7, 2002

(65) Prior Publication Data
US 2004/0027841 A1 Feb. 12, 2004

(30) Foreign Application Priority Data
Aug. 1, 2000 (DE) .......................................... 100 37 379

(51) Int. Cl.[7] ............................................... H02M 7/00
(52) U.S. Cl. ....................... 363/123; 363/127; 363/131; 363/141
(58) Field of Search .......................... 363/68, 71, 144, 363/141, 127, 123, 131, 13

(56) References Cited

U.S. PATENT DOCUMENTS

| 4,141,070 | A | | 2/1979 | Bowling |
| 5,668,711 | A | * | 9/1997 | Lavieville et al. ............ 363/62 |
| 5,737,201 | A | | 4/1998 | Meynard et al. |
| 5,969,960 | A | * | 10/1999 | Tachon et al. ................ 363/60 |
| 6,040,990 | A | * | 3/2000 | Courault ...................... 363/59 |

FOREIGN PATENT DOCUMENTS

FR  2343321  9/1977

\* cited by examiner

*Primary Examiner*—Shawn Riley
(74) *Attorney, Agent, or Firm*—Harness, Dickey & Pierce, P.L.C.

(57) ABSTRACT

A power converter includes at least one capacitor and at least two semiconductor power switches. Each capacitor includes a pair of connectors for connecting the capacitor to the at least two semiconductor power switches. Moreover, each capacitor includes at least one other pair of connectors in order to connect the capacitor to at least two semiconductor power switches or a direct current network.

19 Claims, 3 Drawing Sheets

MODULAR POWER CONVERTER

This application is the national phase under 35 U.S.C. § 371 of PCT International Application No. PCT/EP01/06326 which has an International filing date of Jun. 6, 2001, which designated the United States of America and which claims priority on German Patent Application number 100 37 379.8-32 filed Aug. 1, 2000, the entire contents of which are hereby incorporated herein by reference.

FIELD OF THE INVENTION

The present invention generally relates to a power converter, constructed using a multilevel circuit, for converting direct current to alternating or vice versa. The converter may include at least one capacitor and at least two semiconductor power switches. The or each capacitor may have a connection pair for connection of the capacitor to at least two semiconductor power switches.

BACKGROUND OF THE INVENTION

Power converters using a multilevel circuit are known, for example, from U.S. Pat. No. 5,737,201. This document describes in particular the theoretical principles of a multilevel circuit. A multilevel circuit allows a power converter to be designed in a modular manner. Each of the modules includes at least two semiconductor power switches and at least one capacitor, which is arranged between the power switches. The special feature of the multilevel circuit is that the capacitors are not all of the same potential, but may be related to different potentials (so-called floating capacitors). An intermediate circuit voltage is passed to a number of floating capacitors in such a way that the voltage load on one semiconductor power switch is the result of the different between the voltage on two capacitors.

According to the prior art, the capacitors which are used in power converters have only one connection pair. The connection pair is connected to the semiconductor power switches in a first module. The semiconductor power switches in a further module are connected to the connection pair of the capacitor via an additional electrical connection. This additional electrical connection should be designed to have as low an inductance as possible, in order to reduce the load on the semiconductor power switches. U.S. Pat. No. 5,737,201 does not describe in any more detail the problem associated with the electrical connection between the capacitors and the semiconductor power switches having as low an inductance as possible.

An electrical connection with as low an inductance as possible can be achieved, in entirely general form, by special design measures. For example, a reduction in the size of an area through which a vertical component of a commutation circuit of a module flows leads to the electrical connection having a lower inductance. The inductance can be reduced considerably by using conductors that are as wide as possible between the capacitors and the semiconductor power switches, and by the distance between the forward conductor and the return conductor being as short as possible. A low-inductance electrical connection between the capacitors and the semiconductor power switches is subject to certain limits, relating to the design, accuracy and life of the power converter.

In order to allow a low-inductance electrical connection which can be physically implemented relatively easily between the capacitors and the power switches, it is known from EP 0 944 163 A1 for the capacitors in a power converter to be subdivided into two, and for one half of one capacitor to be associated with the semiconductor power switches of a first module of the power converter, and for the other half of the capacitor to be associated with the power switches of another module. Specific low-inductance electrical conductors, which are in the form of rail packs (so-called busbars) are used to connect the capacitor halves to the power switches of the associated modules. The rail packs have, for example, a laminated structure composed of two copper plates, which are used as conductors, with a plate or sheet composed of a solid insulator arranged between them. Owing to so-called partial discharges between the copper plates, the solid insulator is subject to aging, which restricts the life of the rail pack. Furthermore, low-inductance conductors in the form of rail packs cause problems in handling (mechanical loads on the rail packs can adversely affect their low inductance), and they are very expensive.

A further disadvantage of the power converter which is known from EP 0 944 163 A1 occurs with relatively low rating power converters, in which a single module with one capacitor and two power switches would be sufficient. Even in power converters such as these with only one capacitor, the capacitor is subdivided into two capacitor halves, which forces up the production costs for these known power converters.

SUMMARY OF THE INVENTION

One object of an embodiment of the present invention is to define and to develop a power converter of the type mentioned initially such that it is possible to produce an electrical connection between the capacitors and the power switches whose inductance is as low as possible, whose life is as long as possible, and which is as cost-effective as possible.

In order to achieve this object against the background of the power converter of the type mentioned initially, the an embodiment of the present invention proposes that the or each capacitor has at least one further connection pair for connection of the capacitor to at least two semiconductor power switches or to a DC network.

Thus, according to an embodiment of the present invention, at least one further connection pair is passed to the exterior on the or each capacitor. The capacitor can be connected via the one connection pair to at least two semiconductor power switches in a first module, and via each further connection pair to at least two further semiconductor power switches in further modules, or to a DC network. The connection pairs may be passed out of the capacitor at any desired point. However, it is recommended that the connection pairs be passed out where the design results in further modules of the power converter being arranged.

The capacitors which are used in power converters normally have two contact tracks, which run parallel to one another, in their interior, which contact tracks extend virtually over the entire capacitor length and between which a number of parallel-connected capacitor elements are arranged. Owing to the requirements for low inductance, these contact tracks may be in the form of low-inductance electrical conductors. Connection pairs can be passed out of the capacitor at virtually any desired points, originating from the contact tracks. Low-inductance electrical connections, which are generally provided in any case in capacitors for power converters, are thus used as low-inductance conductors for connection of the capacitors to the semiconductor power switches in the individual modules. Since there is no need for the relatively expensive rail packs (busbars) in the power converter according to the invention, the production and assembly costs of the power converter can be reduced to a major extent.

One advantageous development of an embodiment of the present invention proposes that the connection pairs of one capacitor be passed out of this capacitor on different sides of the capacitor. The capacitor may be physically arranged between the modules to whose semiconductor power switches it is intended to be connected. This allows the power converter to have a particularly compact construction.

One preferred embodiment of the present invention proposes that the or each capacitor have two connection pairs which are passed out of this capacitor on opposite sides of the capacitor. This allows the power converter to be formed from a number of modules arranged one above the other or alongside one another. This elongated structure of the power converter has the advantage that it is easy to see the individual components, so that assembly and maintenance are simplified. The elongated structure results in particular advantages when air is used to cool the semiconductor power switches, since the cooling air—in contrast to the situation in power converters whose construction is complex and angled—can be passed without any problems through the elongated power converter. Apart from being cooled by air, the power converter according to the invention may, of course, also be cooled in any other desired manner.

Each connection pair advantageously has two connecting contacts, each having at least one connecting element, with the connecting elements of each connecting contact being connected via a low-inductance flat rail conductor to a connection of a semiconductor power switch. In order to reduce the inductance of the connection between the capacitor and the power switches, one connecting contact of one connection pair may have a number of connecting elements running parallel to one another. The rail conductors are composed, for example, of copper and are insulated by air. An isolator panel may be arranged between the forward and return rail conductors, in order to avoid short circuits caused by foreign bodies and/or when air cooling is used, to carry the cooling air through the power converter, through its components. The isolator panel is composed, for example, of plastic.

In order to allow the cooling air to he routed in a particularly simple manner along the capacitors, when air cooling is used, another preferred embodiment of the invention proposes that at least one cold plate be arranged at a distance from at least one outer face of the or each capacitor. The distance between the outer faces of the capacitor and the cold plate may be used as a cooling channel, through which the cooling air can be passed laterally along the capacitor.

The upper face and lower face of the or each capacitor advantageously have areas which overhang the at least one outer face of the or each capacitor, and on which the at least one cold plate is mounted. This is of particularly simple structure for the cooling channels for the cooling air, but allows particularly effective air guidance.

The power converter is preferably in the form of an inverter, which converts a DC voltage to an AC voltage. Alternatively, the power converter according to the invention may also be in the form of a DC controller. The power converter according to the invention is particularly suitable for use in the medium-voltage and high-voltage ranges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further features, application options and advantages of the present invention can be found in the following description of exemplary embodiments of the invention, which are illustrated in the figures of the drawing. In this case, all the described or illustrated features form the subject matter of the invention in their own right or in any desired combination, irrespective of their combination in the patent claims or their referral back, and independently of their formulation and representation in the description and in the drawing. In the figures:

DETAILED DESCRIPTION OF THE PREFERRED EMBODIMENTS

Figure 1:
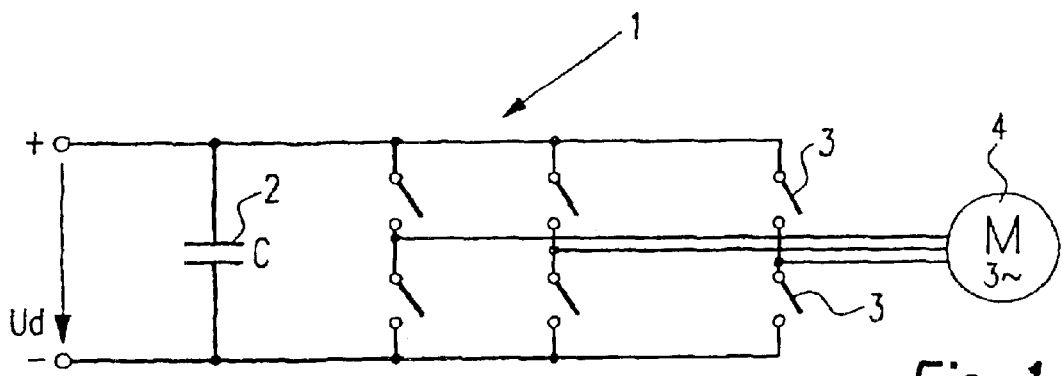
FIG. 1 shows a simplified circuit diagram of a three-phase inverter.

FIG. 1 shows a circuit diagram of a inverter which is known from the prior art. A DC voltage U_d is applied to the input side of the inverter, and is converted by the inverter to an AC voltage, for example to a 3-phase voltage. The DC voltage U_d is applied to a capacitor 2 in the inverter. The inverter has a series circuit comprising two power switches 3 for each phase of the AC voltage. Transistors, thyristors, GTOs (Gate Turn-Off Thyristors) or preferably IGBTs (Insulated Gate Bipolar Transistors) may be used, for example, as the power switches 3. The series circuits formed by the power switches 3 for the individual phases are arranged in parallel with one another and in parallel with the capacitor 2, so that the DC voltage U_d is also applied to the series circuits formed by the power switches 3. The DC voltage U_d is converted to the 3-phase voltage by cyclic opening and closing of the power switches 3. The frequency and the amplitude of the fundamental of the 3-phase voltage can be varied by driving the power switches 3 in a specific manner. The 3-phase voltage may also be supplied to a load, for example to a three-phase motor 4.

Figure 2:
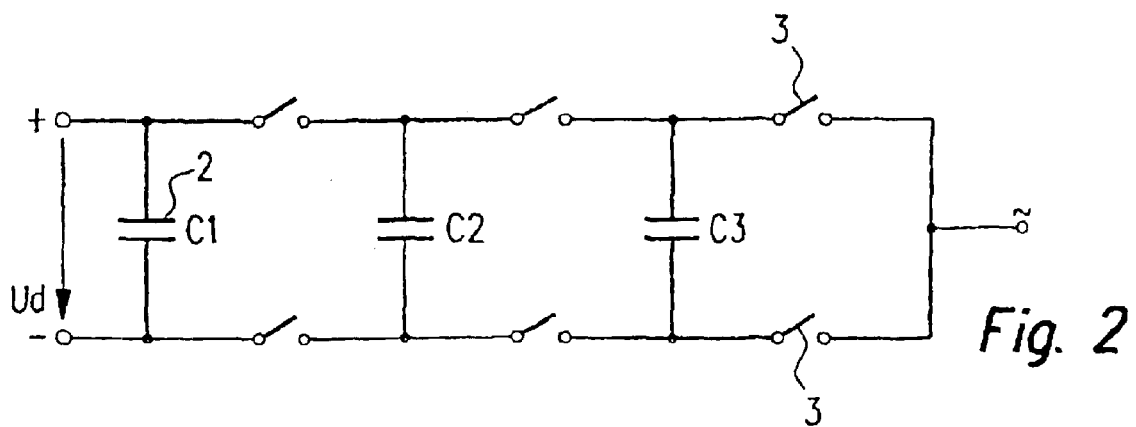
FIG. 2 shows a simplified circuit diagram for one phase of a converter in the form of a multilevel circuit.

FIG. 2 shows a circuit diagram for one phase of a power converter 1 in the form of an inverter, according to an exemplary embodiment of the present invention. The inverter is designed in the form of a so-called multilevel circuit. Power converters 1 using a multilevel circuit are known, for example, from U.S. Pat. No. 5,737,201 where, in particular, the theoretical principles of multilevel circuits and embodiments of power converters using multilevel circuits, but which are not used in practice, are described. The production of a power converter 1 using a multilevel circuit may result in design problems, since the electrical connections between the capacitors 2 and the power switches 3 should be designed to have as low an inductance as possible. One possible way to produce a power converter 1 using a multilevel circuit is known from EP 0 944 163 A1. Reference is expressly made to these two documents.

A multilevel circuit allows the power converter 1 to be designed in a modular manner. In the present exemplary embodiment, the power converter 1 is in the form of a 4-level circuit, that is to say it has three modules for each phase. Each of the modules has two semiconductor power switches 3 and one capacitor 2, arranged between the power switches 3. In the exemplary embodiment shown in FIG. 2, the entire DC voltage U_d is applied to the capacitor C1, ⅔ of the DC voltage U_d is applied to the capacitor C2, and ⅓ of the DC voltage U_d is applied to the capacitor C3.

The special feature of the multilevel circuit is that the capacitors 2 are not all of the same potential, but can be referred to different potentials (so-called floating capacitors). A module intermediate circuit voltage is passed to a number of floating capacitors in such a way that the voltage load on a semiconductor power switch 3 is the difference between the voltage on two capacitors 2.

Figure 3:
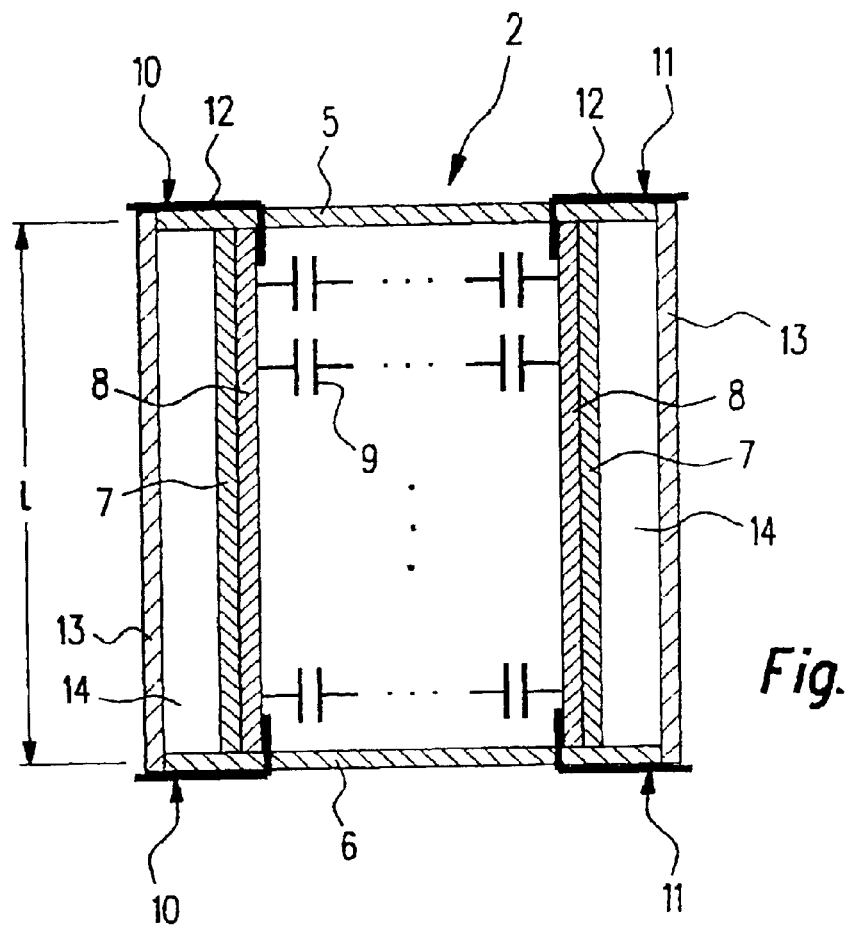
FIG. 3 shows the capacitor for one preferred embodiment of a power converter according to the invention, in a section view from the front.

FIG. 3 shows a capacitor 2 as is used in the power converter 1 according to the invention, in a section view from the front. The capacitor 2 has a housing comprising an upper face 5, a lower face 6 and outer faces 7. Two contact tracks 8 run parallel to one another along the outer faces 7 in the interior of the housing 5, 6, 7. The contact tracks 8 extend virtually over the entire length 1 of the capacitor 2. A number of capacitor elements 9 are arranged between the contact tracks 8 and, together, result in the capacitor 2 having the desired capacitance.

Owing to the requirements for low inductance within the capacitor 2, the contact tracks 8 are in the form of low-inductance electrical conductors. Originating from the contact tracks 8, connection pairs can be passed out of the housing 5, 6, 7 of the capacitor 2 at virtually any desired points in the capacitor 2. However, it is recommended that the connection pairs be passed out of the housing 5, 6, 7 where, by virtue of the design, further modules of the power converter 1 are arranged. The connection pairs each have a number of connecting contacts 10, 11.

Figure 4:
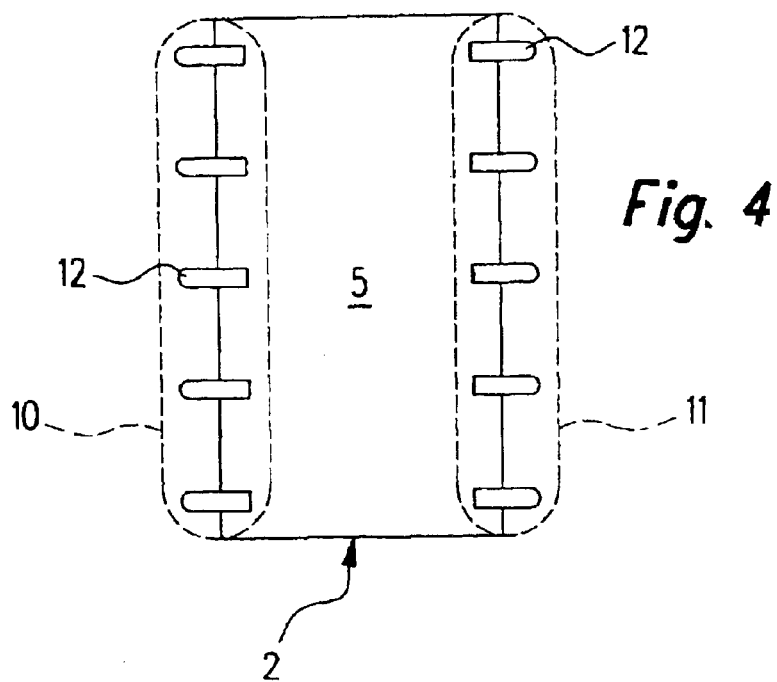
FIG. 4 shows a plan view of the capacitor shown in FIG. 3.

In the present exemplary embodiment, two connection pairs 10, 11 are passed out of the housing 5, 6, 7 of the capacitor 2 on opposite sides, to be more precise on the upper face 5 and on the lower face 6. Each connection pair has two connecting contacts 10, 11. In order to reduce the inductance of the electrical connection between the capacitor 2 and the power switches 3, each connecting contact 10, 11 has a number of connecting elements 12, in the present case five (see FIG. 4).

The upper face 5 and the lower face 6 of the capacitor 2 project beyond the outer faces 7. A cold plate 13 is mounted externally on the projecting areas, so that cooling channels 14 are formed between the outer faces 7 and the cold plates 13, through which cooling air can be passed along the sides of the capacitor 2.

Figure 5:
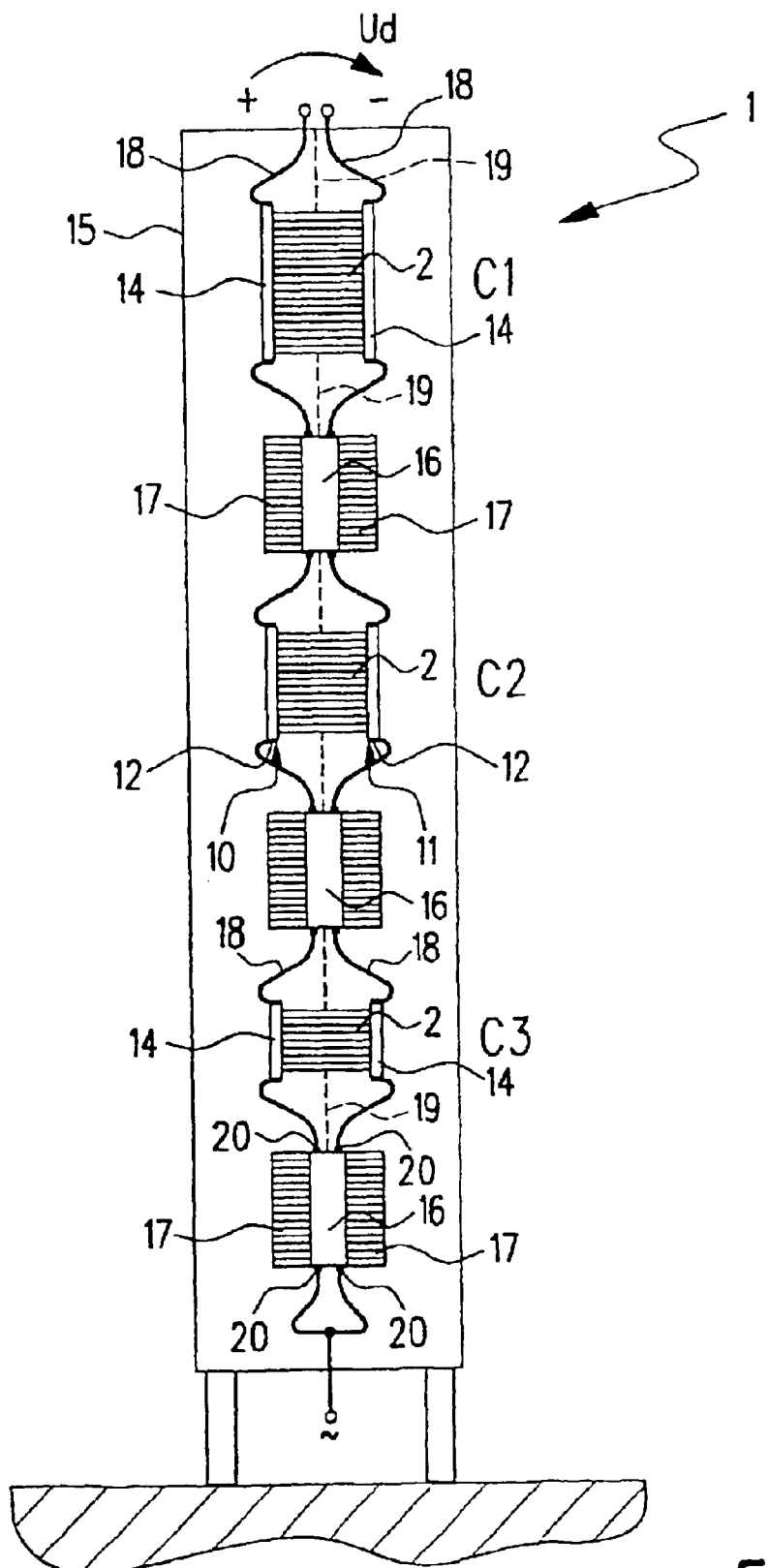
FIG. 5 shows one preferred embodiment of a power converter according to the invention, constructed using a multilevel circuit, in a view from the front.

FIG. 5 shows a power converter 1 according to the invention. The illustrated components of the power converter 1 are the components, as illustrated in FIG. 2, of the circuit for one phase of the power converter 1. The power converter 1 has a housing 15. A capacitor 2 and two semiconductor power switches, which are combined to form a power switch unit 16, are arranged alternately one above the other in the housing 15. A heat sink 17, which is provided with cooling ribs, is mounted on each side of the power switch unit 16. The cooling ribs on the heat sink 17 extend in the same direction as the cooling channels 14 of the capacitors 2. The dimensions of the capacitors 2 are governed essentially by the capacitances and by the voltage of the capacitors 2, and hence also by the number of capacitor elements 9. For example, the capacitor C1 is physically larger than the capacitor C2, and the capacitor C2 is in turn physically larger than the capacitor C3.

The modular design of the power converter 1 can be seen particularly well in FIG. 5. The compact modular design of the power converter 1 according to the invention is only feasible at all by virtue of the design, as described above, of the capacitors 2 with a connection pair 10, 11 on the upper face 5 and a further connection pair 10, 11 on the lower face 6 of the capacitor 2. The electrical connection between the connection pairs 10, 11 of the capacitors 2 and connections 20 of the power switch units 16 or a DC network is produced by way of flat, low-inductance rail conductors 18. The rail conductors 18 are composed of an electrically conductive material, for example of copper, and in the present exemplary embodiment are insulated by air. There is no need to use expensive rail packs (so-called busbars)—as is normal in the prior art—for the power converter 1 according to the invention. Apart from being insulated by air, the rail conductors 18 may, of course, also be insulated by any other materials.

In order to avoid a short circuit between two adjacent rail conductors 18 in an electrical connection resulting from foreign bodies entering the housing 15 (for example a forgotten tool, insects, animals) or the like, an isolator panel 19 can be inserted between two adjacent rail conductors 18. The isolator panels 19 are represented by dashed lines in FIG. 5 and consist of a solid insulator, for example composed of plastic.

The power converter 1 according to the invention requires only a minimum number of additional low-inductance flat rail conductors 18 for connection of the capacitors 2 to the semiconductor power switches 3, since the majority of the electrical connections between the capacitors 2 and the power switches 2 are provided by the low-inductance contact tracks 8 within the capacitors 2.

The modular design of the power converter 1 according to the invention allows the components (in particular the capacitors 2 and the power switch elements 16) of the power converter 1 to be assembled and maintained particularly cost-effectively. The air-insulated, low-inductance, flat rail conductors 18 have a particularly long life, and can also transport high voltages without any problems. By virtue of its design, the power converter 1 according to the invention is suitable for use in the medium-voltage and high-voltage ranges. Furthermore, the components of the power converter 1 according to the invention can be cooled in a simple manner and particularly effectively by way of cooling air, by virtue of the modular design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power converter, constructed using a multilevel circuit, for converting direct current to alternating current or vice versa, comprising:
   at least two semiconductor power switches; and
   at least one capacitor having
      a connection pair connecting the at least one capacitor to the at least two semiconductor power switches, and at least one further connection pair for connection of the at least one capacitor to one of another at least two semiconductor power switches and a DC network.

2. The power converter as claimed in claim 1, wherein the connection pairs of the at least one capacitor are passed out of the at least one capacitor on different sides of thereof.

3. The power converter as claimed in claim 1, wherein the at least one capacitor is a plurality of capacitors, and each capacitor of the plurality of capacitors has two connection pairs which are passed out of the capacitor on opposite sides thereof.

4. The power converter as claimed in claim 1, wherein each connection pair has two connecting contacts, the connecting contacts each having at least one connecting element, with the at least one connecting element of each connecting contact being connected via a low-inductance flat rail conductor to a connection of a semiconductor power switch.

5. The power converter as claimed in claim 1, wherein at least one cold plate is arranged at a distance from at least one outer face of the at least one capacitor.

6. The power converter as claimed in claim 5, wherein an upper face and a lower face of the at least one capacitor have areas which overhang the at least one outer face of the at least one capacitor and on which the at least one cold plate is mounted.

7. The power converter as claimed in claim 1, wherein the power converter is in the form of one of an inverter and a DC controller.

8. The power converter as claimed in claim 2, wherein each connection pair has two connecting contacts, the connecting contacts each having at least one connecting element, with the at least one connecting element of each connecting contact being connected via a low-inductance flat rail conductor to a connection of a semiconductor power switch.

9. The power converter as claimed in claim 3, wherein each connection pair has two connecting contacts, the connecting contacts each having at least one connecting element, with the at least one connecting element of each connecting contact being connected via a low-inductance flat rail conductor to a connection of a semiconductor power switch.

10. The power converter as claimed in claim 2, wherein at least one cold plate is arranged at a distance from at least one outer face of the at least one capacitor.

11. The power converter as claimed in claim 3, wherein at least one cold plate is arranged at a distance from at least one outer face of each capacitor of the plurality of capacitors.

12. The power converter as claimed in claim 4, wherein at least one cold plate is arranged at a distance from at least one outer face of the at least one capacitor.

13. The power converter as claimed in claim 11, wherein an upper face and a lower face of each of the plurality of capacitors have areas which overhang the at least one outer face of each of the plurality of capacitors and on which the at least one cold plate is mounted.

14. The power converter as claimed in claim 2, wherein the power converter is in the form of one of an inverter and a DC controller.

15. The power converter as claimed in claim 3, wherein the power converter is in the form of one of an inverter and a DC controller.

16. The power converter as claimed in claim 4, wherein the power converter is in the form of one of an inverter and a DC controller.

17. The power converter as claimed in claim 5, wherein the power converter is in the form of one of an inverter and a DC controller.

18. The power converter as claimed in claim 6, wherein the power converter is in the form of one of an inverter and a DC controller.

19. A power converter, comprising:
at least one capacitor having a plurality of connection elements in contact with a plurality of power switch units, a first pair of the plurality of connection elements being connected to a first power switch unit of the plurality of power switch units, and a second pair of the plurality of connection elements being connected to a second power switch unit of the plurality of power switch units, wherein each power switch unit includes at least two individual power switches.

* * * * *